（12）United States Patent
Kweon et al.

(10) Patent No.: US 7,210,467 B2
(45) Date of Patent: May 1, 2007

(54) ADVANCED HIGH EFFICIENCY, ULTRA-LOW EMISSION, THERMOCHEMICALLY RECUPERATED RECIPROCATING INTERNAL COMBUSTION ENGINE

(75) Inventors: Chol-Bum Kweon, Barrington, IL (US); Mark J. Khinkis, Morton Grove, IL (US); Vilyam G. Nosach, Kiev (UA); Robert F. Zabransky, Barrington Hills, IL (US)

(73) Assignee: Gas Technology Institute, Des Plaines, IL (US)

( * ) Notice: Subject to any disclaimer, the term of this patent is extended or adjusted under 35 U.S.C. 154(b) by 122 days.

(21) Appl. No.: 10/873,035

(22) Filed: Jun. 22, 2004

(65) Prior Publication Data
US 2005/0279333 A1    Dec. 22, 2005

(51) Int. Cl.
F02B 43/08    (2006.01)
(52) U.S. Cl. ..................... 123/557; 123/25 B
(58) Field of Classification Search ........ 123/543–557, 123/1 A, 25 B, 25 F
See application file for complete search history.

(56) References Cited

U.S. PATENT DOCUMENTS

| | | | |
|---|---|---|---|
| 2,184,141 A | * | 12/1939 | Dodge ...................... 123/25 B |
| 3,918,412 A | | 11/1975 | Lindstrom |
| 3,980,061 A | | 9/1976 | McAlister |
| 4,030,453 A | * | 6/1977 | Sugimoto ...................... 123/3 |
| 4,066,046 A | | 1/1978 | McAlister |
| 4,408,573 A | * | 10/1983 | Schlueter et al. .......... 123/25 P |
| 4,567,857 A | * | 2/1986 | Houseman et al. ............. 123/3 |
| 4,900,333 A | | 2/1990 | Bos |
| 5,057,133 A | | 10/1991 | Chen et al. |
| 5,343,699 A | | 9/1994 | McAlister |
| 5,379,728 A | * | 1/1995 | Cooke ........................... 123/3 |
| 5,394,852 A | | 3/1995 | McAlister |
| 5,515,814 A | * | 5/1996 | Cooke ........................... 123/3 |
| 5,595,059 A | | 1/1997 | Huber et al. |
| 5,896,738 A | | 4/1999 | Yang et al. |
| 6,155,212 A | | 12/2000 | McAlister |
| 6,186,126 B1 | * | 2/2001 | Gray, Jr. ...................... 123/557 |
| 6,223,519 B1 | | 5/2001 | Basu et al. |
| 6,397,790 B1 | | 6/2002 | Collier, Jr. |
| 6,508,209 B1 | | 1/2003 | Collier, Jr. |
| 2003/0012985 A1 | | 1/2003 | McAlister |

FOREIGN PATENT DOCUMENTS

WO    WO 95/27845    10/1995

OTHER PUBLICATIONS

Nosach, V.G., "Quality of Fuel Energy", Izvestiya Akademii Nauk SSSR, Energetika i Transport, vol. 28, No. 2, pp. 161,164, 1990.

(Continued)

*Primary Examiner*—Marguerite McMahon
(74) *Attorney, Agent, or Firm*—Mark E. Fejer

(57) ABSTRACT

An apparatus including a reciprocating internal combustion engine and a thermochemical recuperator in which a fuel is reformed. The thermochemical recuperator is heated by exhaust gases from the reciprocating internal combustion engine and steam for the reforming process is produced by passing feed water through an engine lubricating oil heat exchanger, an engine cooling system heat recovery system and an exhaust gas heat recovery system arranged in series.

10 Claims, 13 Drawing Sheets

OTHER PUBLICATIONS

Nosach, V.G., "Thermochemical Method for Improving Conversion of Fuel Energy into Heat", *Energy of the Fuel*, pp. 40-42, 105-107, 1989.

Nosach, V.G., "ESTEFU for Industrial Furnaces", *Increasing the Effectiveness of Fuel Utilization in Power Generation*, Industry and Transportation, pp. 14-15, 1989.

"Advanced Natural Gas-Fired Turbine System Utilizing Thermochemical Recuperation and/or Partial Oxidation for Electricity Generation, Greenfield and Repowering Applications", Final Report, U.S. Dept. of Energy Contract No. DE-FG21-95MC32071, Mar. 1997.

* cited by examiner

ADVANCED HIGH EFFICIENCY, ULTRA-LOW EMISSION, THERMOCHEMICALLY RECUPERATED RECIPROCATING INTERNAL COMBUSTION ENGINE

BACKGROUND OF THE INVENTION

1. Field of the Invention

This invention relates to an internal combustion engine and a method for operation of an internal combustion engine. This invention also relates to thermochemical recuperators and the use of thermochemical recuperators as fuel reformers for providing reformed fuel to a reciprocating internal combustion engine.

2. Description of Related Art

Natural gas is the most abundant energy source available after coal. People are looking for more ways to use natural gas as fuel because it is inexpensive and burns very cleanly relative to other energy sources, particularly with respect to coal. In addition, because natural gas is in abundant supply, using more natural gas as an energy source provides a means for reducing dependence on imported foreign oils.

Over the past several years, fuel cells, which typically use hydrogen ($H_2$) as a fuel, have been receiving a substantial amount of attention due to their almost emission-free operation. The primary exhaust from a fuel cell using hydrogen, as with other systems in which hydrogen is used as a fuel, is water. It will, thus, be apparent that substantial environmental benefits may be realized from the use of hydrogen as a fuel in other applications as well, such as internal combustion engines, including reciprocating internal combustion engines and gas turbines. In particular, the hydrogen in the fuel extends the lean operating range of an engine and increases the burning velocity, thereby increasing the combustion rate. Thus, in addition to the environmental benefits, the use of hydrogen as a fuel in internal combustion engines also increases combustion and engine efficiencies, thereby increasing fuel economy. However, one problem associated with the use of hydrogen in such applications is the requirement for ready availability of the hydrogen in a form suitable for use therein. Thus, one issue which needs to be addressed is the production of $H_2$ in a manner which satisfies the availability requirements.

Several reforming technologies to produce $H_2$ are known, including autothermal reforming, partial oxidation reforming, plasma reforming, and steam reforming. Reforming of natural gas or other hydrocarbons produces $H_2$-enriched products which, in addition to $H_2$, may also include CO, $CO_2$, and carbon. At the present time, about 90% of the hydrogen produced around the world is from reforming natural gas, as a result of which demand for natural gas is increasing considerably. Recently, efforts to develop various kinds of fuel reformers to reform liquid or gaseous fuels to produce $H_2$-enriched fuels have increased substantially. Most of these reformers use steam reforming technology, which requires heat and steam.

In a typical reciprocating engine system, a significant amount of energy is wasted. Thus, if this energy can be used to reform a lower quality fuel to higher quality fuel, engine efficiency will increase significantly.

The use of a thermochemical method for fuel reforming employing steam was first suggested in 1964. Since then, the use of a thermochemical method employing combustion products or flue gases from coal and natural gas combustion also has been proposed (See Nosach, V. G., *Energy of the Fuel*, U.S.S.R., 1989 and Nosach, V. G., "Increasing the Effectiveness of Fuel Utilization in Power Generation, Industry and Transportation", U.S.S.R., 1989.). However, most of these works were directed to gas turbines and industrial furnaces. The application of thermochemical recuperation to internal combustion (IC) engines was first introduced by O. B., Lindström in 1975. U.S. Pat. No. 3,918,412 to Lindström teaches a method and apparatus for reducing the amount of polluting components in the exhaust gases from internal combustion engines in which a fuel, before being delivered in a gaseous state to the combustion zone or chamber of the engine, is passed through a reforming reactor having a reforming catalyst disposed therein to convert at least a portion of the fuel to carbon monoxide and hydrogen by reaction with steam and carbon dioxide. A portion of the exhaust flow from the internal combustion engine is delivered to the reformer and mixed there with the fuel being delivered to the reformer. The heat content of the exhaust gas is used for the energy requirement of the reforming reaction and the steam and carbon dioxide present as combustion products in the recirculated exhaust gas are used in the reforming reaction. In accordance with one embodiment, air is introduced into the reforming reactor to promote the combustion of fuel and/or reforming reaction products therein. This combustion of fuel and the products of the reforming reaction is adapted such that the reforming reaction is essentially isothermal at a suitable reforming reaction temperature that varies according to the type of reforming catalyst and fuel.

Since the late 1980s, a significant amount of research has been conducted on the use of exhaust gas recirculation (EGR) reforming incorporated into an internal combustion engine. In particular, bench-scale testing has been performed using n-heptane and gasoline. The focus of exhaust gas recirculation reforming was an automotive application using extreme lean-burn conditions. For industrial furnaces, before fuel reforming using the thermochemical recuperation concept was introduced, the primary exhaust energy recuperation was used to preheat the combustion air. This concept has been employed in an engine, termed an "isoengine", having separate cylinders for compression and combustion, where the combustion air after compression is heated by the exhaust energy in a recuperator.

SUMMARY OF THE INVENTION

It is one object of this invention to provide a method and apparatus for providing hydrogen as a fuel for use in reciprocating internal combustion engines.

It is another object of this invention to provide a method and apparatus for reducing the emissions produced by conventional reciprocating internal combustion engines.

It is yet a further object of this invention to provide a method and apparatus for increasing the efficiency of a reciprocating internal combustion engine over conventional such engines.

It is yet another object of this invention to provide a method and apparatus for recovering and utilizing waste heat from reciprocating internal combustion engines.

It is still a further object of this invention to provide a method and apparatus for recovering and utilizing water vapor in exhaust gases from reciprocating internal combustion engines for steam reforming.

These and other objects of this invention are addressed by an apparatus comprising an advanced thermochemical recuperation system, also referred to herein as a thermochemical recuperator, and a reciprocating internal combustion engine, in which apparatus the heat and steam recovered from the waste energy of the engine are used not only for increasing the efficiency of the engine, but also for fuel reforming by the thermochemical recuperator, thereby obviating the need to provide steam and heat from external sources. The reformed fuel contains significant amounts of hydrogen, which increases the engine combustion efficiency, resulting in lower unburned fuel emissions. The amount of inert gas and water vapor in the reformed fuel also decreases $NO_x$ emissions significantly. In addition, the engine is able to operate at lower combustion temperatures, which decreases the closed-cycle losses, resulting in increased thermal efficiency. The thermochemical recuperator can be employed to reform either liquid or gaseous fuels, although liquid fuel reforming may require an evaporator to evaporate the liquid fuel prior to mixing with the steam. The thermochemical recuperator can be incorporated into conventional reciprocating spark-ignition or compression-ignition engines, HCCI (lean) and fuel-rich reciprocating engines with afterburners, Miller-cycle engines, and reciprocating engines with a turbocharger, supercharger, or natural aspiration. The thermochemical recuperator can also be incorporated into coal gasifier and industrial furnace systems to increase systems efficiencies and decrease emissions. In remote areas, a water recovery system can be used to capture water from the engine exhaust for use as feed water for the thermochemical recuperator.

An additional benefit of using the thermochemical recuperator with an internal combustion engine in accordance with this invention is that lower quality fuels may be used, thereby providing the opportunity for further savings in operating costs. In a stationary engine, further emissions reductions may be attained if, for example, either a non-selective catalytic reduction (NSCR) system or three way catalyst is used together with the thermochemical recuperator. Due to cleaner combustion, the maintenance cost of the engine may even be decreased. In addition to new installations, this system may be incorporated into existing diesel or natural gas engines at a relatively low retrofit cost. With the development of new designs and new catalysts, such as nickel-tin (Ni/Sn), the cost of the thermochemical recuperator itself also may be significantly reduced compared to conventional systems.

More particularly, the invention claimed herein is an apparatus comprising a reciprocating internal combustion engine having an engine fuel inlet and an engine exhaust gas outlet, a lubricating oil system adapted to circulate lubricating oil through the reciprocating internal combustion engine, and a cooling system adapted to circulate a cooling fluid through the reciprocating internal combustion engine. The lubricating oil system comprises a lubricating oil heat exchanger adapted to remove heat from the lubricating oil and the cooling system comprises an engine coolant heat recovery system adapted to remove heat from the cooling fluid. The engine further comprises an exhaust gas heat recovery system adapted to recover heat from exhaust gases generated by the reciprocating internal combustion engine. A steam generating circuit having a water inlet and a steam outlet is provided, which steam generating circuit is in serial heat exchange relation with each of the lubricating oil heat exchanger, the engine coolant heat recovery system and exhaust heat recovery system. The apparatus further comprises a thermochemical recuperator having an exhaust gas inlet in fluid communication with the engine exhaust gas outlet, an exhaust gas outlet in fluid communication with the exhaust gas heat recovery system, a feedstock fuel inlet and a reformed fuel outlet, a feedstock fuel conduit in fluid communication with the feedstock fuel inlet and a reformed fuel conduit in fluid communication with the reformed fuel outlet. The feedstock fuel conduit is also in fluid communication with a steam source and the reformed fuel conduit is in fluid communication with the engine fuel inlet.

BRIEF DESCRIPTION OF THE DRAWINGS

These and other objects and features of this invention will be better understood from the following detailed description taken in conjunction with the drawings wherein.

DETAILED DESCRIPTION OF THE PRESENTLY PREFERRED EMBODIMENTS

Figure 1:
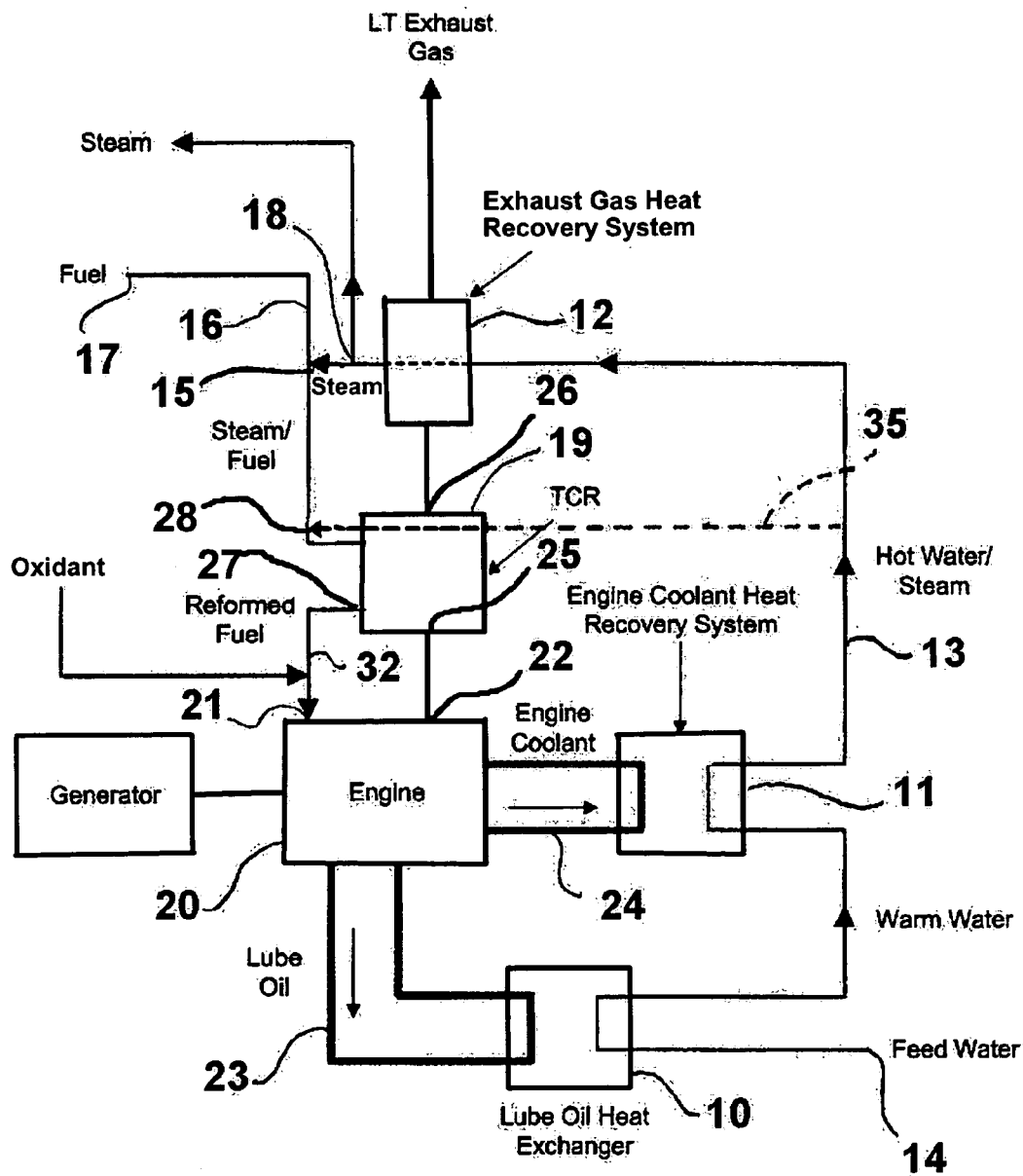
FIG. 1 is a schematic diagram of a thermochemical recuperation system employing steam for reforming in combination with a reciprocating internal combustion engine system in accordance with one embodiment of this invention.

The advanced thermochemical recuperator (TCR) of this invention is an innovative technology that can be retrofitted to, or be newly installed in, a wide range of internal combustion (IC) engines, such as stationary reciprocating engines and gas turbines. As previously stated, the thermochemical recuperator in accordance with one embodiment of this invention uses steam and heat recovered from waste energy such as exhaust energy and closed-cycle heat losses from the engine to reform natural gas or other reformable fuels to a $H_2$-enriched fuel suitable for use in the engines. This endothermic reaction increases the energy content of the fuel significantly, resulting in higher fuel economy. The thermochemical recuperator of this invention is suitable for reforming a variety of liquid and gaseous fuels.

Hydrogen provides numerous benefits to the combustion of a reciprocating internal combustion (IC) engine due to its faster flame speed, shorter quenching distance, etc. Thus, using $H_2$-enriched fuel in a reciprocating internal combustion engine can provide significant benefits in terms of combustion efficiency and emissions (i.e. hydrocarbons). In addition, because the $H_2$-enriched fuel has a greater tolerance to exhaust gas recirculation (EGR), it is possible to use a higher compression ratio engine, resulting in higher engine power output and higher engine efficiency. Further, the $H_2$-enriched fuel increases the ignitability of the mixture due to its broader flammability limits and low-ignition energy requirements relative to natural gas. This feature may allow the engine to auto-ignite under compression, so that neither spark plug nor diesel pilot injection may be needed, or at least may consume less energy for the ignition system of the engine.

Because the reformed fuel contains significant amounts of $CO_2$ and water vapor ($H_2O$), $NO_x$ emissions can be decreased significantly due to lowered combustion temperatures. CO emissions can also be decreased by the shift reaction of CO and $H_2O$. The lowered combustion temperature also decreases the closed-cycle heat losses of the reciprocating internal combustion engine, which further increases the thermal efficiency of the engine. Thermodynamic analysis has shown that using the thermochemical recuperation system of this invention in combination with a reciprocating internal combustion engine can increase the engine efficiency up to at least about 10%. However, the temperature of the reformed fuel may be much higher than the baseline fuel, which can lead to higher combustion temperatures. It will, thus, be apparent that there is a tradeoff between the effect of the inert gas and water vapor and the addition of sensible energy in the reformed fuel. The combustion temperature can be reduced by other effective means such as using a heat exchanger to reduce the reformed fuel temperature, reducing reforming rate of the fuel, or by using more exhaust gas recirculation, which has an influence on the reforming rate of the thermochemical recuperator. Higher exhaust gas temperatures will increase the reforming rate, thereby allowing more $H_2$ to be supplied into the combustion chamber. The increase of water vapor injection can further increase the production of $H_2$ due to the water vapor ($H_2O$) reacting with CO produced by the thermochemical recuperator.

FIG. 1 shows a steam-thermochemical recuperation system in combination with a stationary reciprocating internal combustion engine for combined heat and power (CHP) in accordance with one embodiment of this invention. It will, however, be appreciated by those skilled in the art that this invention is not limited to stationary reciprocating internal combustion engines, but rather it can be applied to other engine systems such as stationary compressors, stationary power generation, etc., and such other applications are deemed to be within the scope of this invention.

As shown in FIG. 1, the advanced high efficiency, ultra-low emission, thermochemically recuperated reciprocating internal combustion engine system of this invention comprises a reciprocating internal combustion engine 20 having an engine fuel inlet 21 and an engine exhaust gas outlet 22, a lubricating oil system 23 adapted to circulate lubricating oil through reciprocating internal combustion engine 20 and a cooling system 24 adapted to circulate a cooling fluid through reciprocating internal combustion engine 20. The apparatus of this invention further comprises a lubricating oil heat exchanger 10 in thermal communication with lubricating oil system 23, adapted to remove heat from lubricating oil circulating through lubricating oil system 23 and an engine coolant heat recovery system 11 in thermal communication with cooling system 24 and adapted to remove heat from cooling fluid, which may be liquid, vaporous or gaseous, circulating through cooling system 24. A thermochemical recuperator (TCR) 19, shown in accordance with one embodiment in FIG. 18 and described in further detail herein below, is provided having an exhaust gas inlet 25 in fluid communication with engine exhaust gas outlet 22 and having an exhaust gas outlet 26 in fluid communication with exhaust gas heat recovery system 12, which is adapted to recover heat from the exhaust gas generated by internal combustion engine 20. Thermochemical recuperator 19 is further provided with a recuperator feedstock fuel inlet 28 and a reformed fuel outlet 27. A steam generating circuit 13 is provided having a feed water inlet 14 and a primary steam outlet 15. Steam generating circuit 13 is in serial heat exchange relation with each of lubricating oil heat exchanger 10, engine coolant heat recovery system 11 and, in accordance with one embodiment of this invention, exhaust gas heat recovery system 12. A fuel conduit 16 in fluid communication with a steam source is provided having a feedstock fuel inlet 17 and a feedstock fuel outlet in fluid communication with recuperator feedstock fuel inlet 28. A reformed fuel conduit 32 provides fluid communication between the reformed fuel outlet 27 and engine fuel inlet 21 of reciprocating internal combustion engine 20. In accordance with another preferred embodiment of this invention, steam generating circuit 13 may be routed through thermochemical recuperator 19 as indicated by dotted line 35, recovering heat from the engine exhaust gases directly in thermochemical recuperator 19 and enabling the elimination of exhaust gas heat recovery system 12. The effect of this embodiment is to reduce the potential heat losses which may occur through conduits extending between thermochemical recuperator 19 and exhaust gas heat recovery system 12.

As shown in FIG. 1, steam is generated through engine lubricating oil heat exchanger 10, coolant heat recovery system 11, and exhaust gas heat recovery system 12 that are arranged in series. Feed water is introduced into steam generating circuit 13 through feed water inlet 14 and, as it passes in order through each of engine lubricating oil heat exchanger 10, coolant heat recovery system 11, and exhaust gas heat recovery system 12, it is progressively heated until it becomes steam. A portion of the steam generated in accordance with one embodiment of this invention is used for fuel reforming and any remaining steam may be used for other purposes. That is, a portion of the steam generated exits steam generating circuit 13 through primary steam outlet 15, which is in fluid communication with fuel conduit 16, thereby enabling the steam portion to mix with the feedstock fuel. A typical range of a ratio of steam to fuel carbon atom (steam/fuel carbon atom) is in the range of about 1:2 to about 1:6. Any remaining portion of steam exits steam generating circuit 13 through secondary steam outlet 18, which remaining portion of steam is available for other uses. The mixture of fuel and steam is passed through fuel conduit 16 and into thermochemical recuperator 19, as a result of which the fuel is reformed to produce a hydrogen-enriched fuel, which, in turn, is introduced into reciprocating internal combustion engine 20 through engine fuel inlet 21.

Figure 18:
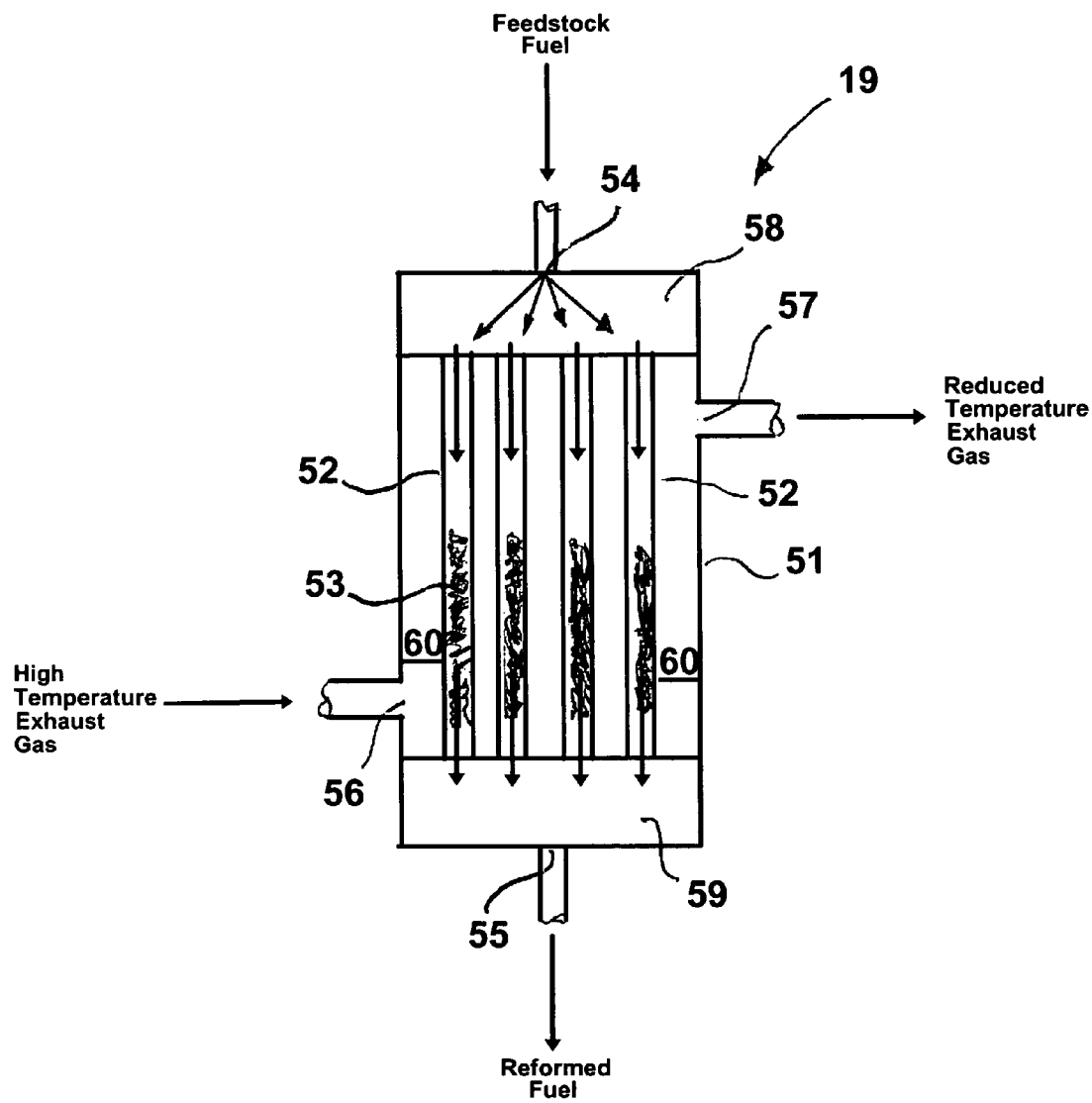
FIG. 18 is a schematic diagram of one embodiment of a thermochemical recuperator.

FIG. 18 is a general schematic diagram of a thermochemical recuperator 19 in accordance with one embodiment of this invention. As shown therein, thermochemical recuperator 19 comprises an outer shell 51 enclosing a heat exchange space 60 and having a high temperature exhaust gas inlet opening 56, a reduced temperature exhaust gas outlet opening 57, a feedstock fuel inlet opening 54 and a reformed fuel outlet opening 55. Disposed within outer shell 51 is a feedstock fuel plenum 58 in fluid communication with said feedstock fuel inlet opening 54 and a reformed fuel plenum 59 in fluid communication with reformed fuel outlet opening 55. Disposed within heat exchange space 60 and extending between and providing fluid communication between feedstock fuel plenum 58 and reformed fuel plenum 59 is at least one reformer conduit 52 in which is disposed a reformer catalyst 53. In operation, a feedstock fuel is introduced through feedstock fuel inlet opening 54 into feedstock fuel plenum 58 from which the feedstock fuel passes into the at least one reformer conduit 52 and high temperature exhaust gas is introduced through high temperature exhaust gas inlet opening 56 into heat exchange space 60. Heat from the high temperature exhaust gas disposed within heat exchange space 60 is transferred through the conduit wall of reformer conduit 52 into the interior of reformer conduit 52, resulting in a reduced temperature exhaust gas and heating of the reformer catalyst 53 disposed within reformer conduit 52 as well as the feedstock fuel flowing therethrough. The heated feedstock fuel contacts the heated reformer catalyst 53 disposed within reformer conduit 52, producing $H_2$-enriched reformed fuel. The $H_2$-enriched reformed fuel passes into reformed fuel plenum 59 from which it is withdrawn through reformed fuel outlet opening 55. The reduced temperature exhaust gas passes out of heat exchange space 60 through reduced temperature exhaust gas outlet opening 57.

As shown in FIGS. 1 and 18, exhaust gas energy is used as a source of heat for the thermochemical recuperator 19. The outlet temperature as the reformed fuel exits from thermochemical recuperator 19 is one of the major parameters determining the fuel reforming-rate of thereof. Therefore, it is important to maintain the engine-out exhaust gas temperature above a predetermined level. Determining the exhaust gas temperature of the reciprocating internal combustion engine is also dependent on the type of catalyst used for reforming of the feedstock fuel. Suitable reforming catalysts are metal-based catalysts such as nickel and platinum. Nickel (Ni)-based catalysts usually require a relatively high reforming temperature, for example, 1200° F. (648.9° C.), and they are inexpensive. On the other hand, platinum (Pt)-based catalysts are effective at lower temperatures (above about 800° F.), but they are expensive. Engine engineers prefer lower engine exhaust temperatures because lower exhaust temperatures correlate with better engine performance and increased engine durability.

Exhaust gas recirculation gases contain significant amounts of water vapor (i.e. steam), carbon dioxide ($CO_2$), and nitrogen ($N_2$). Therefore, the fuel reformer in accordance with one embodiment of this invention is adapted to use the steam and carbon dioxide from the recirculated exhaust gases for the fuel reforming process. One of the benefits of using recirculated exhaust gases is that they are already at a relatively high temperature, enabling the thermochemical recuperator to perform better due to the high exhaust gas/fuel temperature.

Cooled exhaust gas recirculation systems have recently been used by many engine manufacturers for heavy-duty diesel engines to meet the 2004 EPA emissions standard. Large concentrations of inert gases and steam in the recirculated exhaust gas have a significant impact on the reduction of nitrogen oxides ($NO_x$). However, several concerns have been raised regarding the cooled exhaust gas recirculation system. Although having an advantage in terms of emissions reduction, the exhaust gas recirculation system has a drawback regarding engine durability, which increases maintenance cost of the engine. In particular, soot particles in the recirculated exhaust gas stream are harmful to a turbocharger, which is vulnerable to any impact by solid particles. The soot particles may also damage the engine itself. It should be noted here that the purpose of the recirculated exhaust gas usage in the thermochemical recuperator of this invention differs from the exhaust gas recirculation system in diesel engines. The exhaust gas recirculation system employed in connection with the thermochemical recuperator of this invention is used mainly to provide heat, steam and carbon dioxide for fuel reforming, not to promote emissions reduction. In addition, soot production in natural gas-fired engines is significantly lower than in diesel engines. To protect the thermochemical recuperator from any soot particles in the engine exhaust gas, the recirculated exhaust gases can be filtered to screen out the soot prior to entering the thermochemical recuperator. However, generally speaking, soot should not actually be formed at all due to the substantial amount of $H_2O$ and $CO_2$ in the fuel.

In addition to soot particles, sulfur in any fuel also can damage the turbocharger or catalyst in the thermochemical recuperator. Diesel fuel contains significant amounts of sulfur itself, although ultra-low sulfur diesel fuel typically contains less than about 15 ppm. However, even this ultra-low sulfur content in the fuel can damage the durability of the engine.

Recently, a new type of diesel fuel termed "Fischer-Tropsch (F-T) diesel fuel" has been introduced. This fuel can be derived from synthesis gas produced from natural gas or coal. The advantage of this fuel is near-zero sulfur content. Unlike diesel fuels, processed natural gas contains negligible amounts of sulfur (~0.001 wt %) and its combustion products contain negligible amounts of soot in terms of mass. However, even this small amount of sulfur should be removed before entering the thermochemical recuperator.

Figure 2:
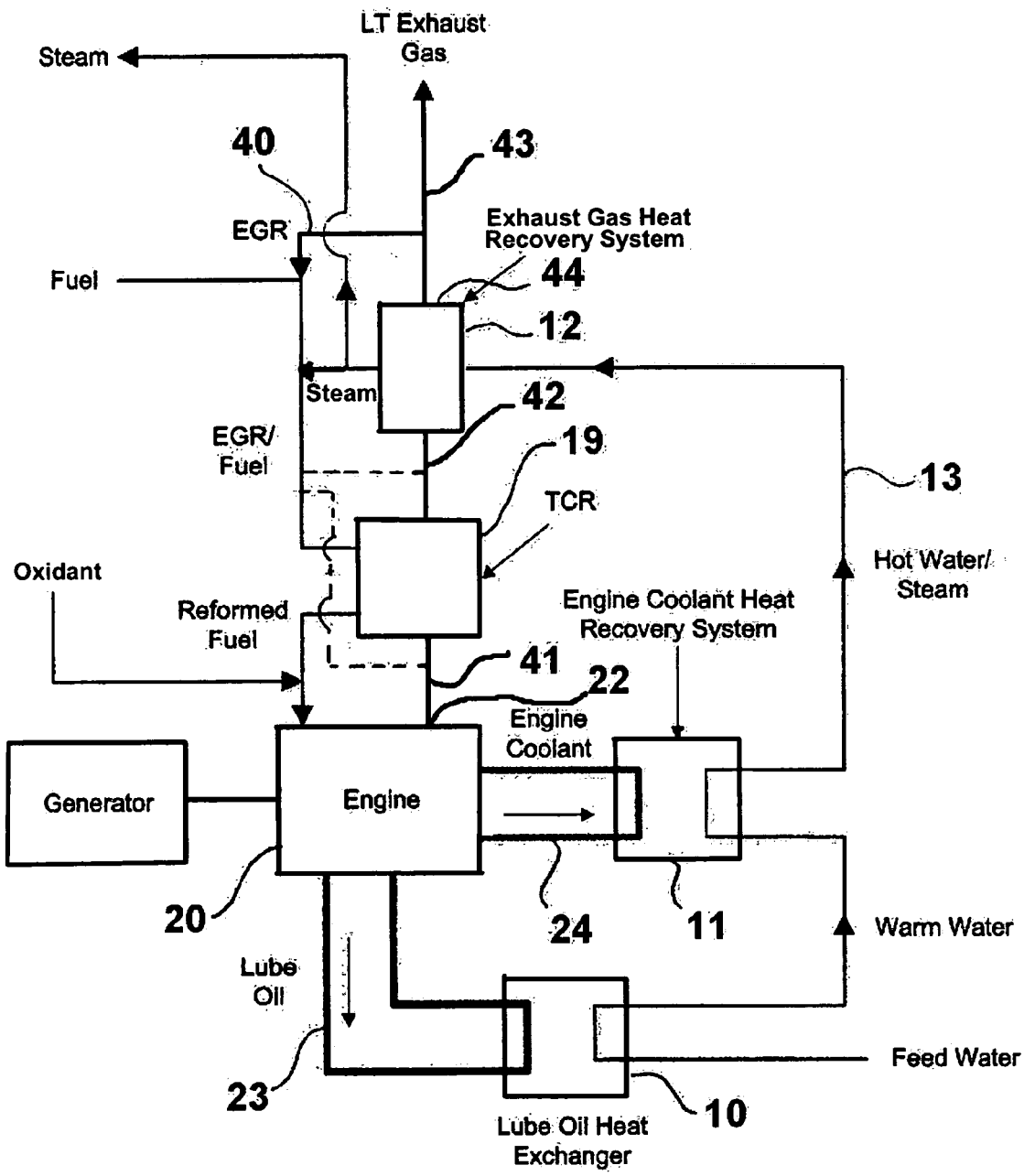
FIG. 2 is a schematic diagram of a thermochemical recuperation system employing exhaust gas recirculation for reforming in combination with a reciprocating internal combustion engine system in accordance with one embodiment of this invention.

FIG. 2 shows a thermochemical recuperator employing exhaust gas recirculation in combination with a stationary reciprocating internal combustion engine 20 for combined heat and power (CHP) in accordance with one embodiment of this invention. In this system, steam and additional heat are provided to the thermochemical recuperator 19 by means of exhaust gas recirculation through exhaust gas conduit 40. It should be noted that typically more than 10% by volume of engine exhaust gas is water vapor and more than 10% by volume is carbon dioxide, thereby providing at least a portion of the requisite components required for fuel reforming. The recirculated exhaust gases may be extracted from any point downstream of the engine exhaust gas outlet 22. In accordance with the embodiment shown in FIG. 2, the exhaust gas path 41, 42, 43 of the exhaust gases exiting reciprocating internal combustion engine 20 is through thermochemical recuperator 19 and then through exhaust gas heat recovery system 12. Accordingly, exhaust gases for mixing with the feedstock fuel may be withdrawn from the portion of the exhaust gas path 41 disposed between reciprocating internal combustion engine 20 and thermochemical recuperator 19, from the portion of the exhaust path 42 disposed between thermochemical recuperator 19 and exhaust gas heat recovery system 12 or the portion of the exhaust path 43 disposed at the exhaust gas outlet 44 of exhaust gas heat recovery system 12. The additional heat in the recirculated exhaust gases can increase the reforming rate of the thermochemical recuperator. As previously suggested, a disadvantage of the thermochemical recuperator using exhaust gas recirculation is the presence of nano-soot particles contained in the recirculated exhaust gases, which may damage the activity of the catalyst employed for fuel reforming. Therefore, it may be desirable to screen out the soot particles in the recirculated exhaust gases prior to entering the fuel reformer. In accordance with this embodiment, the steam produced through the previously described heat recovery system can be used for other purposes.

Currently, there are in existence or under development several reciprocating engine combustion cycles. Conventional spark-ignition and compression-ignition engines can accommodate the thermochemical recuperator disclosed herein. Recently, homogenous charge compression ignition (HCCl) engines have been receiving attention as a means for improving fuel economy (~10–15% improvement) and significantly decreasing $NO_x$ and PM emissions, compared to those of conventional spark-ignition (SI) engines. While HCCl engines are less practical in the passenger car application due to their narrow operating regime, they can be used for medium load power production for stationary engines. It is also possible to extend the operating range of the HCCI engines by using a cooled exhaust gas recirculation system or water injection, etc. Due to its significantly lower combustion temperature, applying the thermochemical recuperator of this invention to the HCCI engine is less feasible unless the HCCI engine operates at higher loads or other means such as an afterburner are used to increase the after-combustion gas temperature.

Another type of cycle engine that has a potential for increased engine efficiency is a Miller-cycle engine. The Miller-cycle engine may be one of the engines for power generation and compressors widely used in the future because it can attain a higher efficiency compared to other engine cycles. It is estimated that the increased efficiency may be as high as about 15%, or possibly higher. This is due to the fact that the engine can have a higher compression ratio in which the actual compression ratio is 10–15% lower than the theoretical compression ratio by leaving the intake valve open during part of the compression stroke, while the actual expansion ratio is the same as the theoretical compression ratio. The engine performance is directly proportional to the expansion ratio of the engine. One can have a higher engine power output, thus higher engine efficiency. Because the intake valve is open during part of the compression stroke, a Miller-cycle engine uses a supercharger rather than a turbocharger. The main reason for this is to precisely control the boost pressure of the intake charge, which is important for the Miller-cycle engine. The crankshaft of the engine drives the supercharger, while the turbocharger is driven by the waste exhaust energy. Because it uses the waste exhaust energy, the turbocharger has a time lag, in contrast to a supercharger, which does not.

Figure 3:
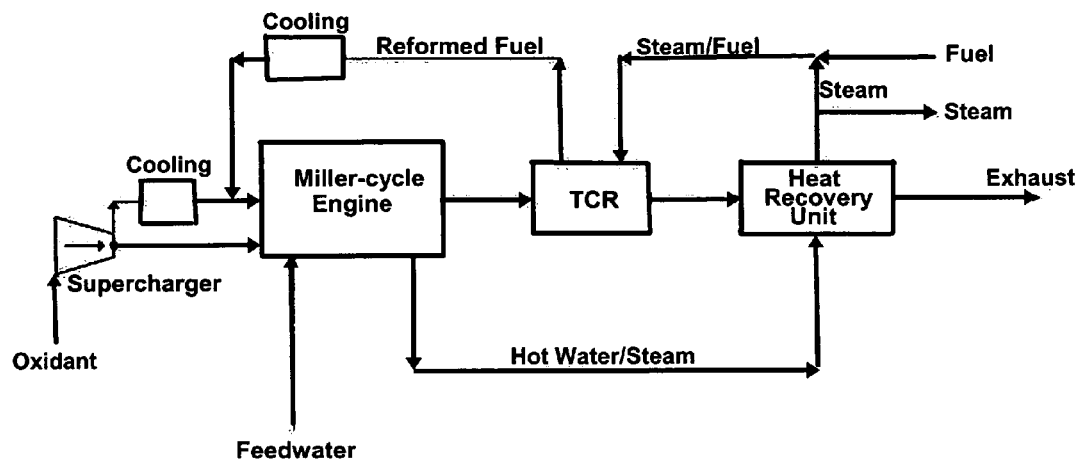
FIG. 3 is a schematic diagram of a thermochemical recuperation system in combination with a Miller-cycle internal combustion engine system in accordance with another embodiment of this invention.

Because the Miller-cycle engine uses a supercharger to boost the charge pressure, the waste exhaust energy can be used for the thermochemical recuperator to reform the natural gas to the $H_2$-enriched fuel. In particular, the waste energy (exhaust energy and closed-cycle heat losses) is used to generate steam and provide heat to the thermochemical recuperator. In this process, the reformed fuel will have higher chemical and thermal energy than the base fuel. The thermal energy can be extracted from the reformed fuel by using a heat exchanger and this is preferred to increase the engine power and to protect the engine from knocking. Additionally, using the thermochemical recuperator with the Miller-cycle engine may increase the engine efficiency significantly, while emitting significantly lower emissions without an aftertreatment system. FIG. 3 shows the thermochemical recuperator in accordance with one embodiment of this invention in combination with a Miller-cycle engine.

A turbocharger allows an engine to burn more fuel and air by packing more into the existing cylinders, thereby increasing its boost pressure up to about 45 psi. Its role is the same as the supercharger. However, the turbocharger uses the waste exhaust energy as its power source, while the supercharger, as previously stated, is driven by the crankshaft. By supplying approximately 50% more air into the cylinders, ideally the engine can get 50% more power than a naturally aspirated (NA) engine. However, the real power improvements will be somewhat lower, approximately 30 to 40%, due to the losses in the system. The turbocharger is so popular because it can significantly boost the engine power without significantly increasing the engine weight. And the engine weight is directly related to the engine fuel economy for vehicles. The power produced by the turbocharger is determined by the exhaust flow rate and the enthalpy difference between the upstream (1) and downstream (2). The enthalpy (h) is a state variable that can be determined by three precisely measurable quantities: internal energy (u), pressure (P), and volume (v) as shown in the Equation 1.

$$\dot{W}/\dot{m}=h_1-h_2;\ h=u+pv;\ u=u(T) \tag{1}$$

Figure 4:
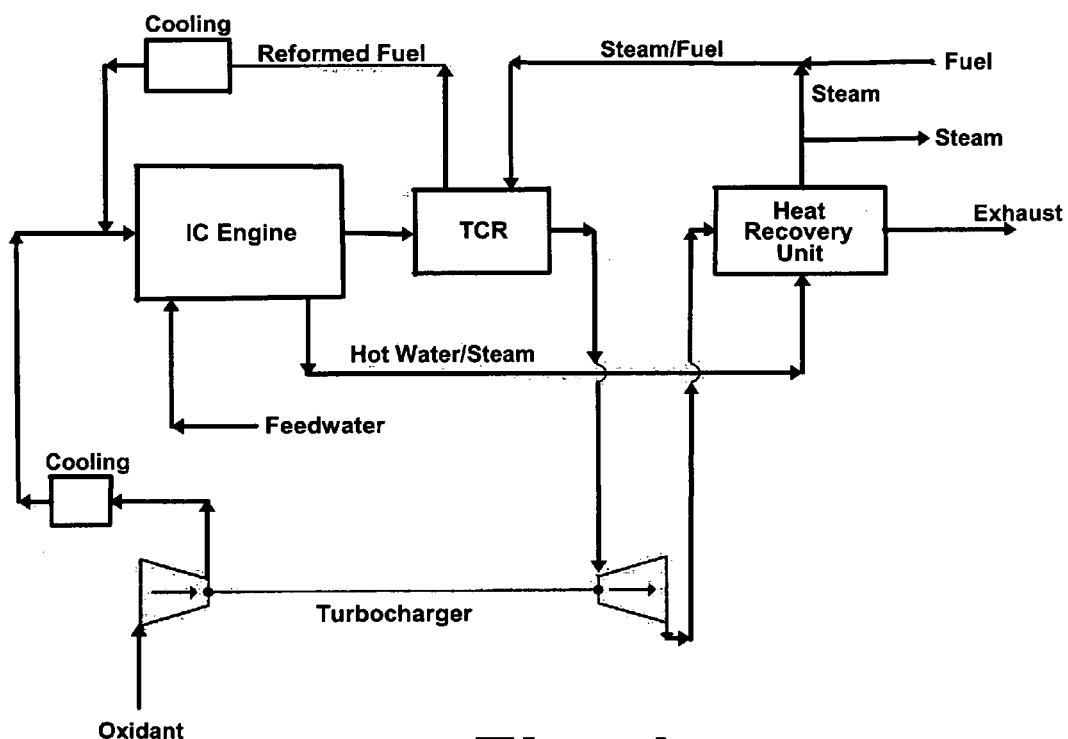
FIG. 4 is a schematic diagram of a thermochemical recuperation system in combination with a reciprocating internal combustion engine employing a turbocharger in accordance with one embodiment of this invention.

The internal energy is a function of temperature (T). Incorporation of the thermochemical recuperation fuel reformer into an engine with a turbocharger in accordance with one embodiment of this invention is shown in FIG. 4. The power obtainable through the turbine in the turbocharger system can be significantly decreased, because a significant amount of the exhaust energy, particularly internal energy, is transferred to the thermochemical recuperator in the form of heat for fuel reforming. The changes in the pressure and volume can be negligible through the thermochemical recuperator system. Although there may be less steam production through the exhaust heat recovery system, the steam produced should be at least enough for use in the thermochemical recuperation fuel reformer. Because of the energy extraction for the thermochemical recuperator, if one uses both the thermochemical recuperator and a turbocharger in a reciprocating internal combustion engine, an optimization of these systems is required to obtain the maximum system efficiency. If the thermochemical recuperator is used in a naturally aspirated engine, the efficiency of the engine can be significantly increased. The thermochemical recuperator employing exhaust gas recirculation in accordance with one embodiment of this invention can be used for an engine with the turbocharger; however, the power produced by the turbocharger may be again decreased, albeit less than the steam reforming case. If the recirculated exhaust gases are extracted downstream of the turbocharger, there will be no change in the turbocharger efficiency but the reforming rate of the thermochemical recuperator may decrease somewhat. If the recirculated exhaust gases are extracted upstream of the turbocharger, the efficiency of the turbocharger will drop, but the reforming rate of the thermochemical recuperator will increase due to the higher gas temperatures.

Figure 5:
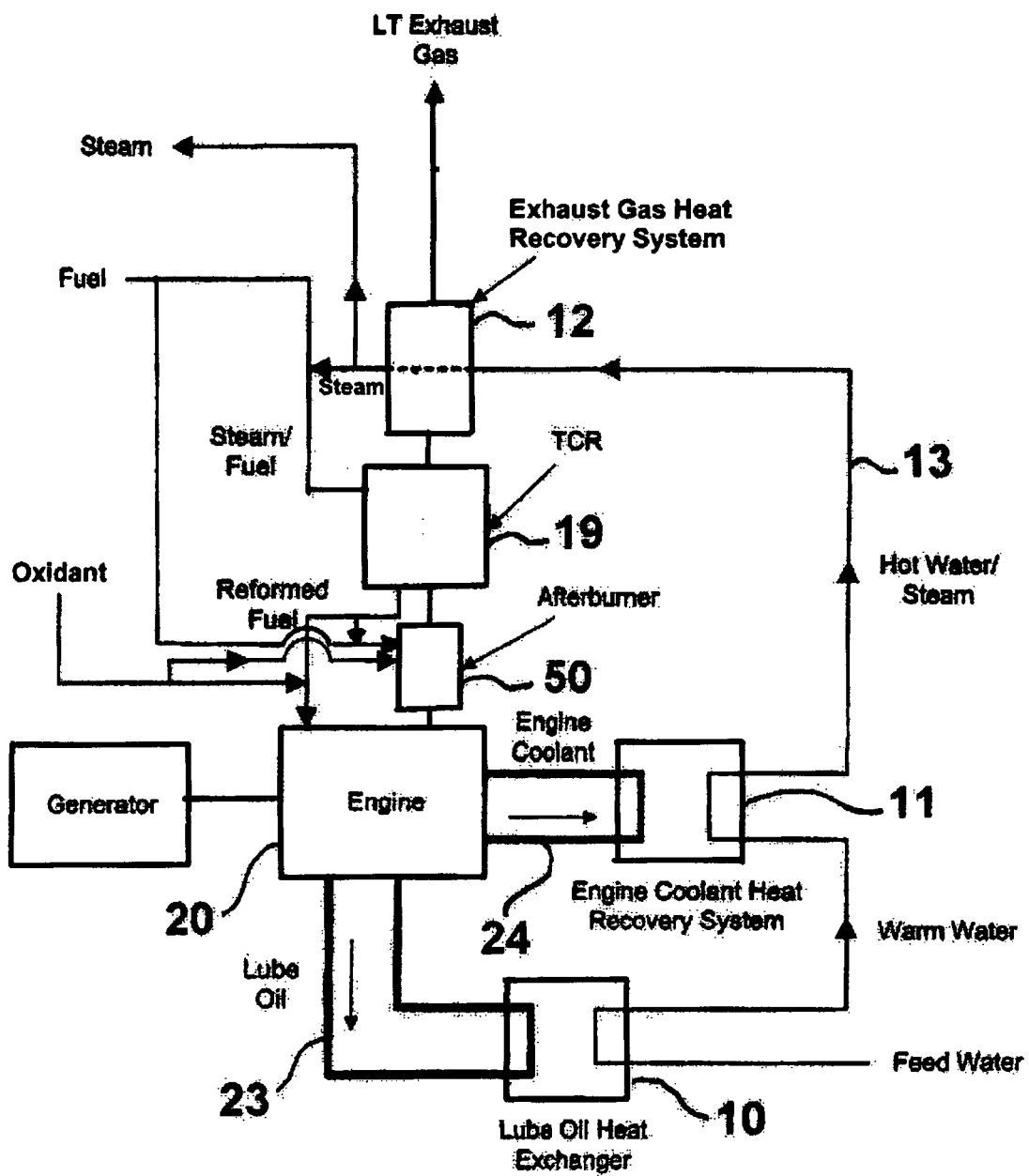
FIG. 5 is a schematic diagram of a thermochemical recuperation system in combination with a reciprocating internal combustion engine employing an afterburner in accordance with one embodiment of this invention.

Use of an afterburner is particularly suitable in two extreme cases: extremely lean combustion and extremely rich combustion. As in the case of a HCCI engine where the engine-out exhaust gas temperature is so low that the thermochemical recuperator application may not be feasible, an afterburner 50 can be employed upstream of the thermochemical recuperator 19 to increase the exhaust gas temperature to levels suitable for promoting the reforming rate of the thermochemical recuperator as shown in FIG. 5. In accordance with this embodiment of the invention, natural gas or reformed fuel is introduced into the afterburner as a fuel. For a sub-stoichiometric combustion engine, the afterburner can also be used to completely burn the unburned fuels leaving the engine so as to decrease unwanted exhaust emissions. In this case, the combustion gas temperatures after the afterburner can be extremely high because the sub-stoichiometric engine exhaust gas temperature is already high. Thus, the reforming rate can be increased significantly. In the case of the sub-stoichiometric engine, using steam reforming with a thermochemical recuperator may be preferred to using exhaust gas recirculation with the thermochemical recuperator due to significant soot particles produced, although it is still much lower than in diesel engines. For stationary engines, using the afterburner to control the reformer temperature should not be a problem.

Figure 6:
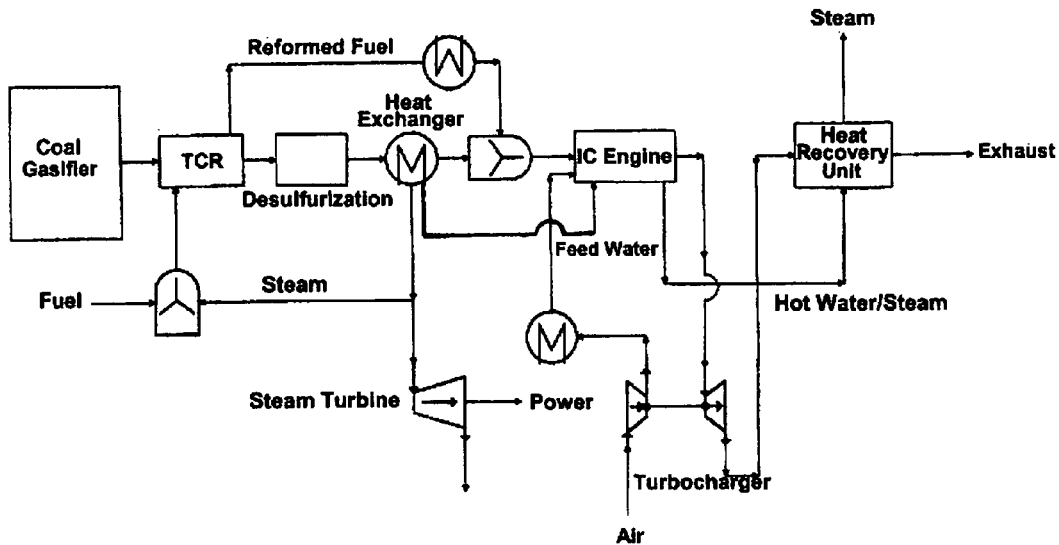
FIG. 6 is a schematic diagram of a thermochemical recuperation system in combination with a reciprocating internal combustion engine/coal gasification system in accordance with one embodiment of this invention.

Coal gases were used as a fuel to internal combustion engines in the 1800s. These days, coal gasifiers are combined with gas turbines and/or steam turbines to increase system efficiency. It is known that internal combustion engines have higher efficiencies than gas turbines in the power generation range of approximately 0.5 to 8 MWe. The thermochemical recuperator/reciprocating internal combustion engine concept in accordance with this invention can be combined with a coal gasifier together with a steam turbine to increase the system efficiency and decrease emissions as shown in FIG. 6. In this concept, the coal gases are mixed with the reformed fuel before being introduced into the internal combustion engine. The ratio of these gases can be controlled as necessary to meet system requirements. In accordance with one preferred embodiment of this invention, higher efficiencies are obtained than with combined gas and steam turbines. However, due to the presence of a significant amount of sulfur, the coal gases must be processed to remove the sulfur prior to being introduced into the internal combustion engine and steam turbine so as not to negatively impact their durability and reliability.

Figure 7:
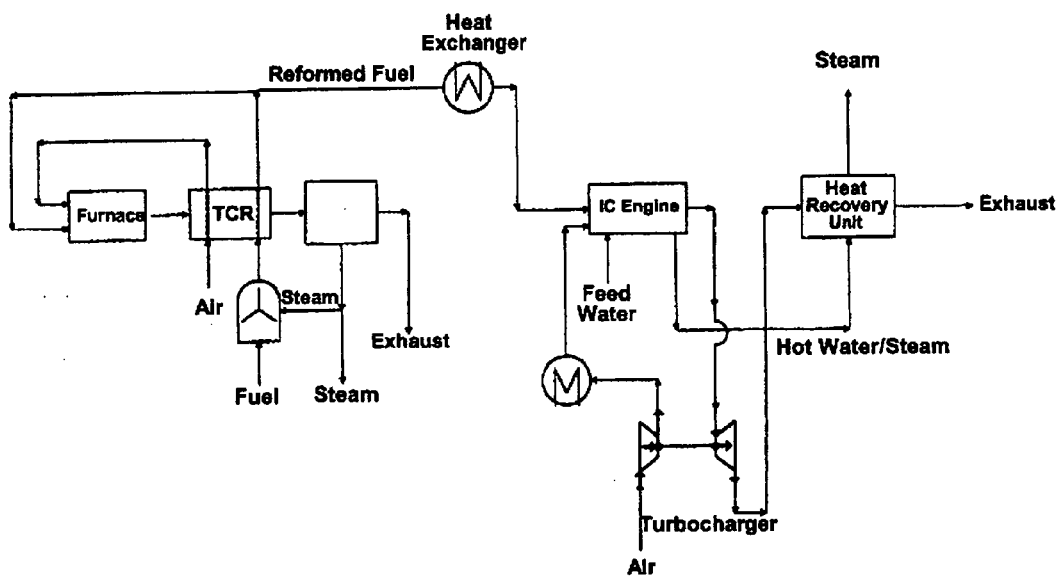
FIG. 7 is a schematic diagram of a thermochemical recuperation system in combination with a reciprocating internal combustion engine/industrial furnace system in accordance with one embodiment of this invention.

FIG. 7 shows one embodiment of this invention in which the thermochemical recuperator is employed in combination with reciprocating internal combustion engines and an industrial furnace. The steam and heat for the thermochemical recuperator in this instance are actually provided by the industrial furnace. The reformed fuel is used for both the furnace and the internal combustion engine. As shown, the internal combustion engine comprises a turbocharger. Using the reformed fuel as the fuel for both the thermochemical recuperator and the internal combustion engine decreases the fuel consumption rate substantially, while at the same time decreasing the emissions dramatically, even without the application of any post-treatment means.

As discussed earlier, the steam required for fuel reforming may be produced from the engine lube oil and coolant cooling systems and/or from the exhaust heat recovery system. However, the steam may also be provided to the thermochemical recuperator through the use of recirculated exhaust gases. In this case, the reformed fuel temperature is quite high (over 500° C. in many cases). However, hot intake charges (i.e. fuel/air mixture) will limit the engine power output due to lower charge density and will increase knocking possibility. By comparison, cooling the reformed fuel with a heat recovery system will increase the engine power output and decrease the possibility of engine knocking by filling the combustion chamber with more fuel/air mixture in each cycle. In addition, the sensible energy in the reformed fuel can be used to generate steam using a heat exchanger. This steam can be routed to the intake of the thermochemical recuperator to mix with the fuel. The additional use of water for the thermochemical recuperator may increase the operating cost of the engine; however, this increase may be offset by savings in fuel consumption and lower maintenance costs.

Figure 8:
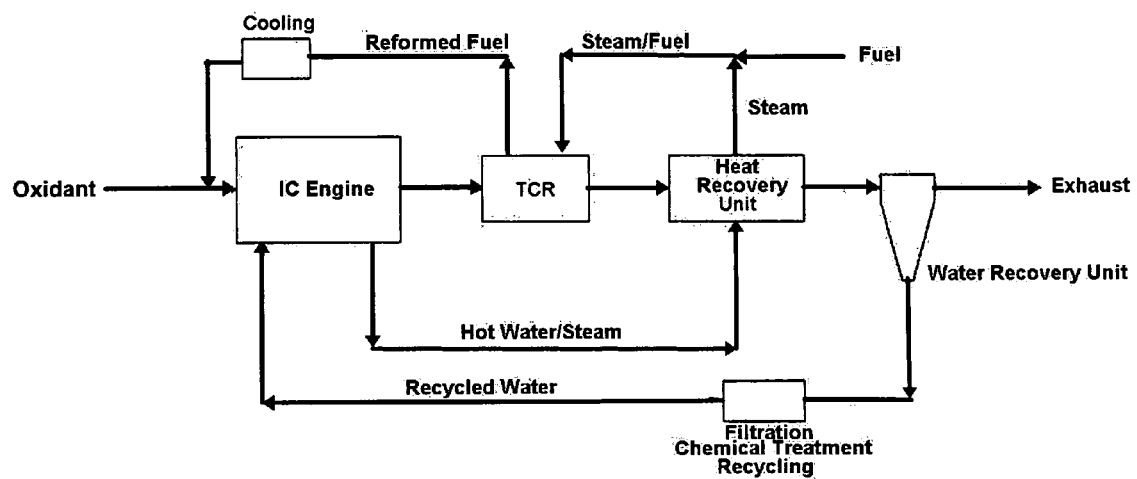
FIG. 8 is a schematic diagram of a thermochemical recuperation system in combination with a reciprocating internal combustion engine system and employing a water recovery unit in accordance with one embodiment of this invention.

In remote areas where fresh water supply is short, a water recovery system can be used to collect water from the engine exhaust gas for the steam-reforming thermochemical recuperator as shown in FIG. 8. Note that 1 kg of natural gas can produce 2.25 kg of water. Test results indicate that using a water recovery system in combination with the thermochemical recuperator is feasible in remote areas where the cost of fresh water is high, although there is an additional cost to the unit. However, the cost savings resulting from the use of a higher efficiency engine may more than offset this additional cost.

Figure 9:
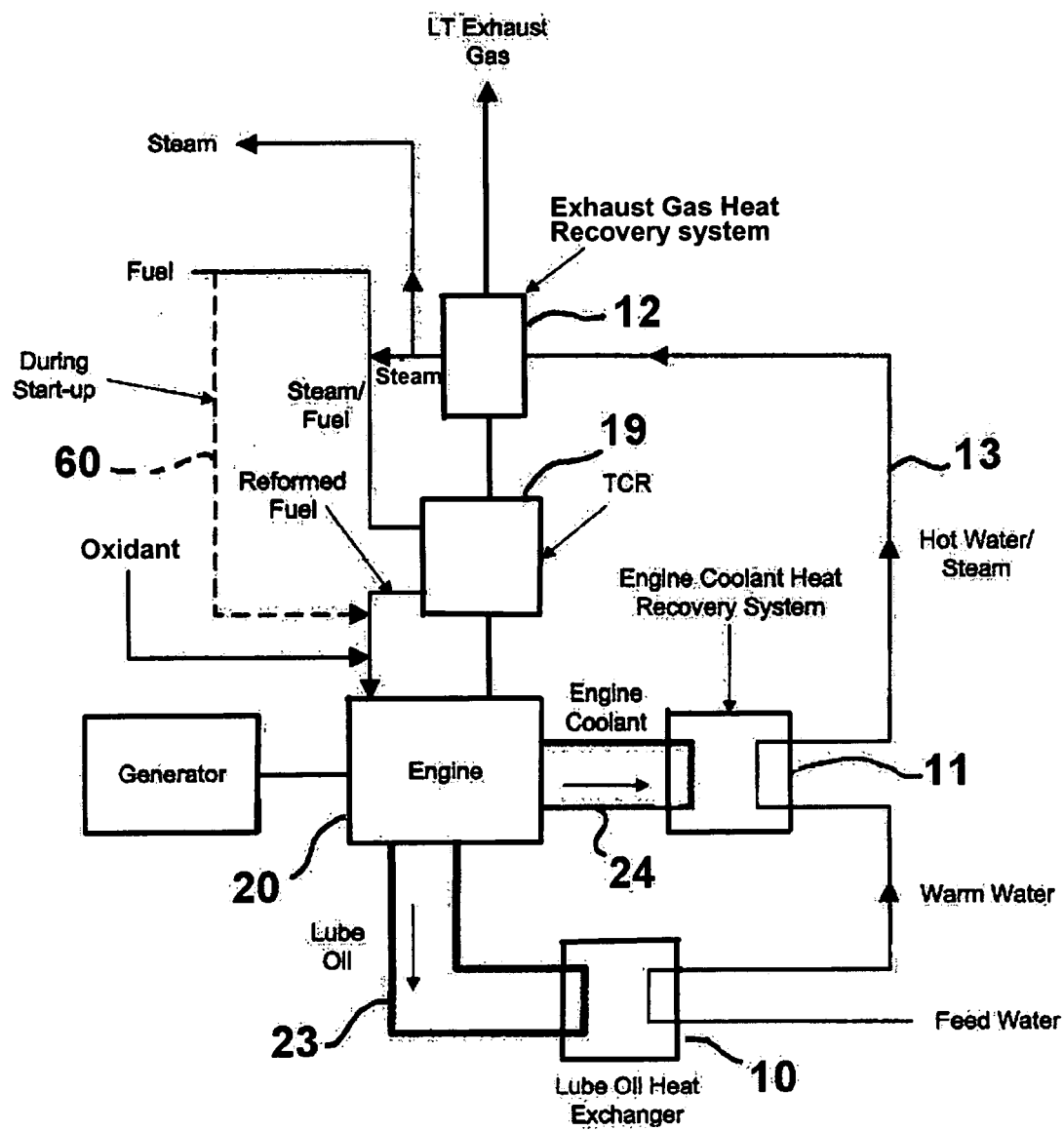
FIG. 9 is a schematic diagram of a thermochemical recuperation system in combination with a reciprocating internal combustion engine system having a fuel supply line employed for start-up of the combined systems in accordance with one embodiment of this invention.

As previously indicated, the reforming rate of the thermochemical recuperator is directly dependent on the thermochemical recuperator inlet temperature or the engine exhaust temperature. During start-up of the reciprocating internal combustion engine, the engine-out gas temperature is not high enough to reform the fuel. Thus, the engine control system must supply a base fuel, e.g. feedstock fuel, to the engine during the start-up mode, after which the system may be switched to a thermochemical recuperator operating mode after the engine-out gas temperature is high enough to sustain the thermochemical recuperator reforming. FIG. 9 shows the fuel supply line 60 for the start-up. It may be possible to pass the base fuel through the thermochemical recuperator even when the recuperator temperature is low; however, the engine control system may have more difficulty in controlling the variable property fuel over time. An alternative method for the start-up of the thermochemical recuperator is to use a fast heating system, such as an electrical heater or plasmatron.

Figure 10:
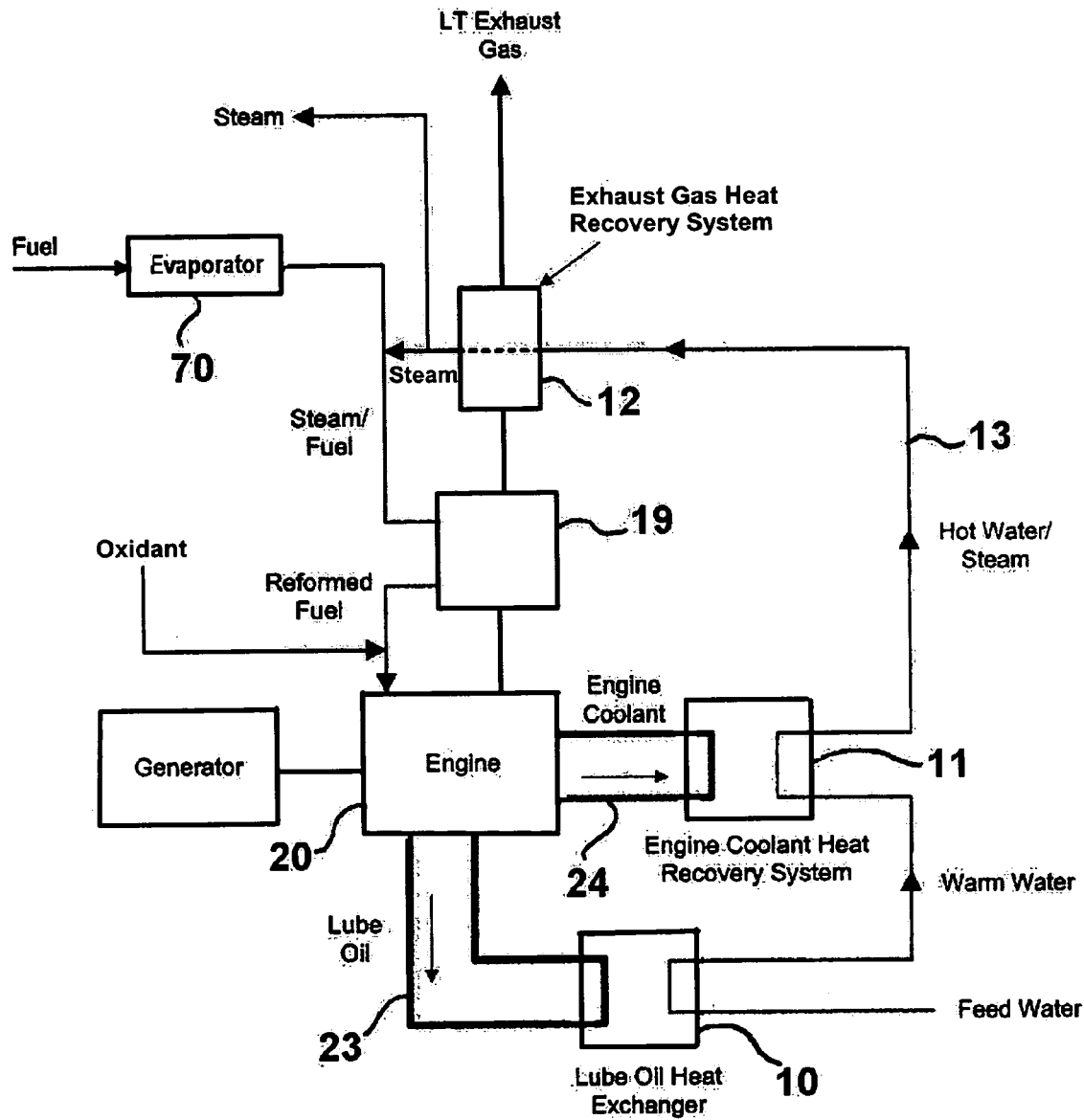
FIG. 10 is a schematic diagram of a thermochemical recuperation system employing a liquid fuel evaporator in combination with a reciprocating internal combustion engine in accordance with one embodiment of this invention.

In principle, any liquid or gaseous fuel can be used in the thermochemical recuperator reforming method and apparatus of this invention. For a liquid fuel, an evaporator 70 may be used to evaporate the fuel prior to mixing with the steam as shown in FIG. 10. However, additional energy may be required for the evaporator. Alternatively, the exhaust energy or other waste energy may be used for the evaporator. For fuels with high sulfur content, desulfurization of the fuel is required to protect the fuel reformer catalyst from deactivation. If the fuel is liquid, desulfurization may be performed before or after the evaporator.

Thermochemical recuperation uses the endothermic reaction of the baseline fuel and steam at a high temperature or recirculated exhaust gas over a catalyst to improve efficiency. Because the reaction is endothermic, the product gas will contain more chemical and sensible energy than the baseline fuel. Because the fuel energy changes through reforming, higher engine power output will be attained insofar as the combustion air supply allows. Because the reformed fuel also contains a significant amount of hydrogen, higher combustion efficiency will be attained. The product gas also contains $CO_2$ and water vapor ($H_2O$), leading to lower combustion temperatures, which, like exhaust gas recirculation, lowers $NO_x$ emissions. Because natural gas contains more than 90% methane ($CH_4$), methane was used as the basis for the following analysis.

Figure 11:
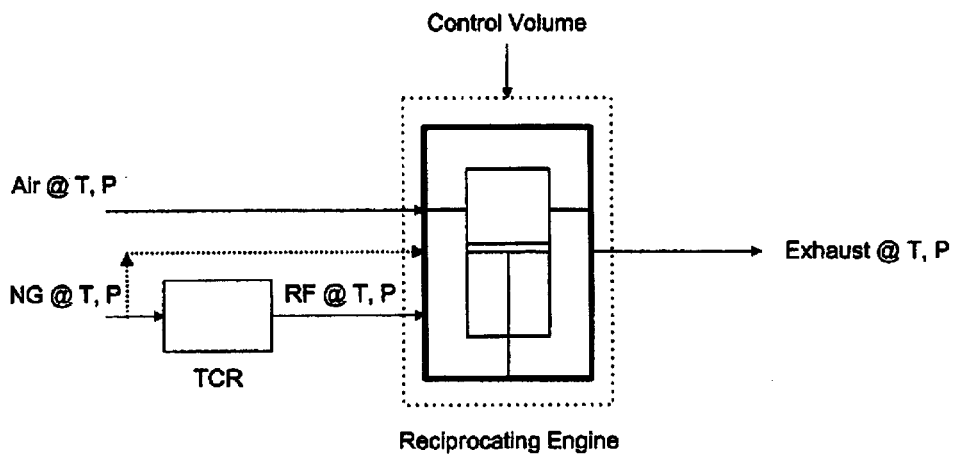
FIG. 11 is a schematic diagram showing a comparison between an ideal cycle engine with and without thermochemical recuperation.

An ideal cycle engine (compression ratio=13:1) with isentropic compression and expansion, constant volume adiabatic combustion, and shifting equilibrium to reference state (T=25° C., P=1 atm) was used in the preliminary investigation of the effect of thermochemical recuperator reformed fuel on engine performance, efficiency, and emissions. To simplify the analysis, it is assumed that all pressures and temperatures outside of the control volume are at reference pressure and temperature. Although the reformed fuel may have a higher temperature, its temperature and pressure were also maintained at reference temperature and pressure. Thus, the analysis considers only the chemical energy of the fuel and excludes any sensible energy. The sensible energy can be recovered from the reformed fuel to generate steam or hot water. The schematic of the system is shown in FIG. 11.

Fuel conversion efficiency (in this case, it is the same as the thermal efficiency) is used to represent the engine efficiency. For the heating value of a fuel, a normal practice in internal combustion engine analysis is to use the lower heating value (LHV) at constant pressure, because an engine is a steady flow device and the water in the exhaust is always in vapor form. However, it is appropriate to state explicitly whether LHV or HHV is used. In the calculation of the fuel conversion efficiency in Equation 4, the fuel consumption rate and the heating value of the fuel before the thermochemical recuperation fuel reforming were used.

$$\eta = \frac{\dot{W}_c}{\dot{m}_f LHV} \quad (4)$$

In the current analysis, natural gas (i.e. methane) is used as the baseline fuel. Therefore, the fuel consumption rate and heating value are of natural gas regardless of the fuel type burned in the engine. The numerator is the actual power output produced by the engine.

Combustion and exhaust losses of the fuel energy were calculated by performing the availability analysis. Since the engine used in the current analysis is an adiabatic engine, there are no energy losses through the engine lube oil and coolant cooling system. Combustion loss is an irreversible loss and only can be decreased by increasing the combustion efficiency. One of the ways to increase the combustion efficiency is to use a higher quality fuel such as the $H_2$-enriched fuel in natural gas engines. Exhaust energy loss can be recovered by using a heat recovery system downstream of the engine. One of the best examples is a turbocharger, which uses the exhaust energy to boost the intake charge air pressure. In this way, more fuel can be supplied into the cylinder for the same air/fuel ratio, leading to higher engine power output. For the calculation of the combustion and exhaust losses, the actual power output in the above equation is replaced with the availability of combustion and exhaust gas. In that way, the percentages of the losses in the combustion and exhaust gas can be obtained.

Figure 12:
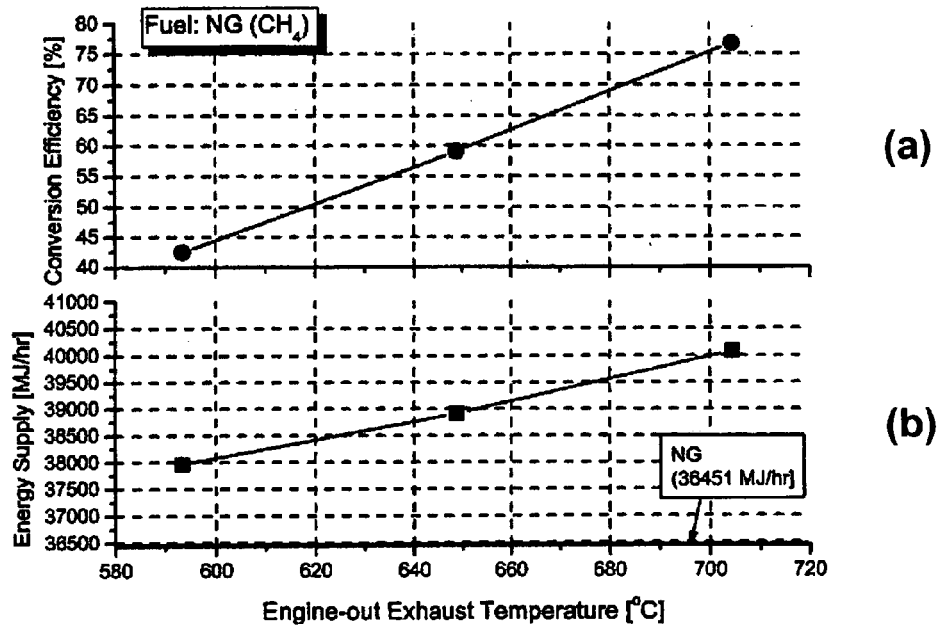
FIGS. 12a and 12b are diagrams showing the conversion efficiency and energy content, respectively, of a reciprocating internal combustion engine employing thermochemical recuperation in accordance with one embodiment of this invention as a function of engine-out exhaust gas temperature.

FIG. 12 shows the conversion efficiency (a) and energy content of the reformed fuel (b) as a function of the engine-out exhaust gas temperature. The reforming analysis was performed using a 10° F. approach to equilibrium. The ratio of steam to fuel carbon atom in the present analysis is 2. The catalyst used in the thermodynamic analysis is Ni, which is a typical catalyst used in steam reforming. The conversion efficiency is based on a 100% conversion of methane to hydrogen. It is clearly shown that the conversion efficiency of the thermochemical recuperator is directly proportional to the engine-out exhaust gas temperature, more precisely the reformer exhaust gas inlet temperature. As the engine exhaust gas temperature increased, the LHV of the reformed fuel decreased while the fuel mass flow rate increased. The total energy supply to the engine is the product of the LHV and fuel mass flow rate and it increased significantly with thermochemical recuperator fuel reforming as shown in FIG. 12.

Table 1 shows the inert gas ($CO_2$) and water vapor ($H_2O$) concentrations in the reformed fuel as the engine-out exhaust gas temperature changes. The total concentration of these two species is close to 41% at 593.3° C. (110° F.) and it decreases as the engine-out exhaust gas temperature increases. In any case, within typical thermochemical recuperator operating ranges, the concentration of these species will be significant.

TABLE 1

Inert Gas and Water Vapor in the Reformed Fuel

| Engine-out T | $CO_2$ | $H_2O(v)$ | Total |
| --- | --- | --- | --- |
| 593.3° C. | 8.46% | 32.53% | 40.99% |
| 648.8° C. | 8.41% | 25.35% | 33.76% |
| 704.4° C. | 7.21% | 19.92% | 27.13% |

Table 2 shows engine performance and efficiency when the thermochemical recuperator reformed fuel was used for the adiabatic engine, compared with the engine using natural gas only.

TABLE 2

Engine performance and efficiency with and without fuel reforming at stoichiometric condition

| | Conversion Efficiency [%] | Thermal Efficiency | Combustion Loss | Exhaust Loss | Sum | Net Power Output [MW] | Adiabatic Flame Temperature [K] |
| --- | --- | --- | --- | --- | --- | --- | --- |
| | | Percentage of fuel heating value (LHV) of natural gas | | | | | |
| No Reforming | | 50.09 | 17.48 | 32.44 | 100.01 | 5.07 | 2888.64 |
| | 42.45 | 53.44 | 15.56 | 34.90 | 103.89 | 5.41 | 2713.72 |

TABLE 2-continued

Engine performance and efficiency with and without fuel reforming at stoichiometric condition

| Conversion Efficiency [%] | Thermal Efficiency Percentage of fuel heating value (LHV) of natural gas | Combustion Loss | Exhaust Loss | Sum | Net Power Output [MW] | Adiabatic Flame Temperature [K] |
|---|---|---|---|---|---|---|
| 59.0 | 54.81 | 14.65 | 36.95 | 106.41 | 5.55 | 2767.98 |
| 76.8 | 56.38 | 13.69 | 39.41 | 109.48 | 5.71 | 2827.53 |

It should be noted that because the reformed fuel has a higher energy content than the natural gas, the sum of the efficiency and losses is over 100%. It should also be noted that the power increased up to 12.62% for the conditions considered in the present analysis. This clearly shows that using a reformed fuel will lead to a significant increase in engine performance and efficiency. Because the richer engine operating condition will further decrease the efficiency of the engine, it would be more appropriate to consider the gain in the efficiency as a 12.62% fuel saving by using the thermochemical recuperator reforming for the same engine power output as the baseline engine under the conditions considered here. If the supply of the combustion air is not limited, such as in the Miller-cycle engine with the supercharger, higher engine power output can be attained.

Figure 13:
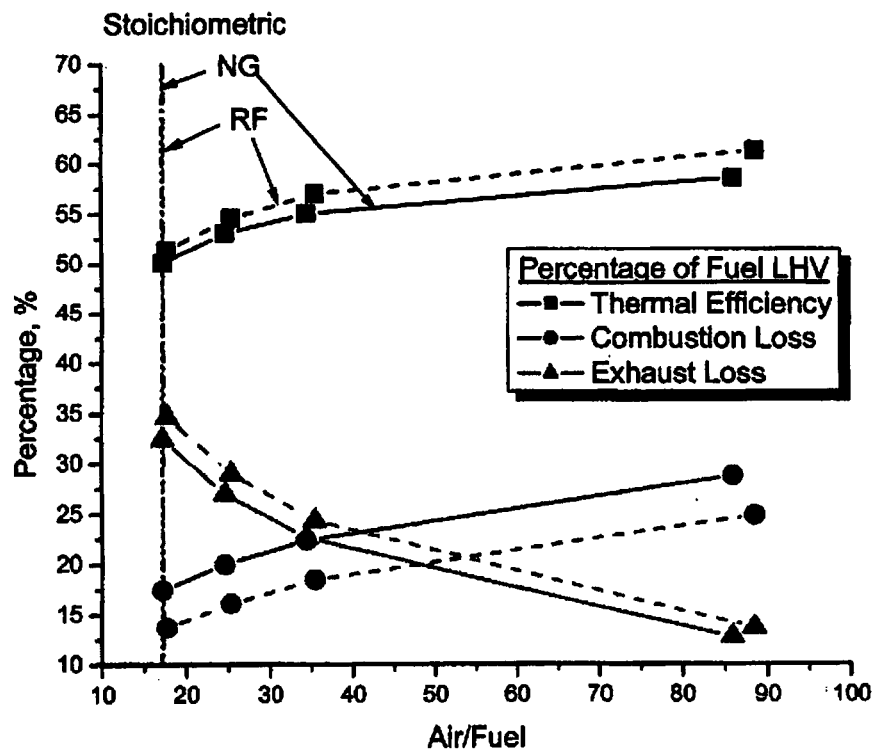
FIG. 13 is a diagram showing energy balance at maximum power as a function of air/fuel ratio.

FIG. 13 shows the energy balance at maximum power with natural gas and reformed fuels for various air/fuel ratios. With an increasing A/F ratio, the engine thermal efficiency increased for both fuels. This was attained because the exhaust loss decreased more rapidly than the increase of the combustion loss with increasing A/F ratio. The reformed fuel showed higher thermal efficiency and lower combustion loss than the natural gas, while it showed higher exhaust loss. Because the gain in the combustion loss (~14–22%) was higher than the reduction in the exhaust loss (~6.9–7.2%), the reformed fuel showed ~2.5–4.7% increase in the thermal efficiencies. This benefit may be obtained due to better combustion with the $H_2$-enriched fuel. The higher exhaust loss with the reformed fuel may be due to the higher concentrations of $CO_2$ and water vapor in the reformed fuel. These gases acted as a heat sink and absorbed some of the fuel energy and caused higher loss in the exhaust energy.

Figure 14:
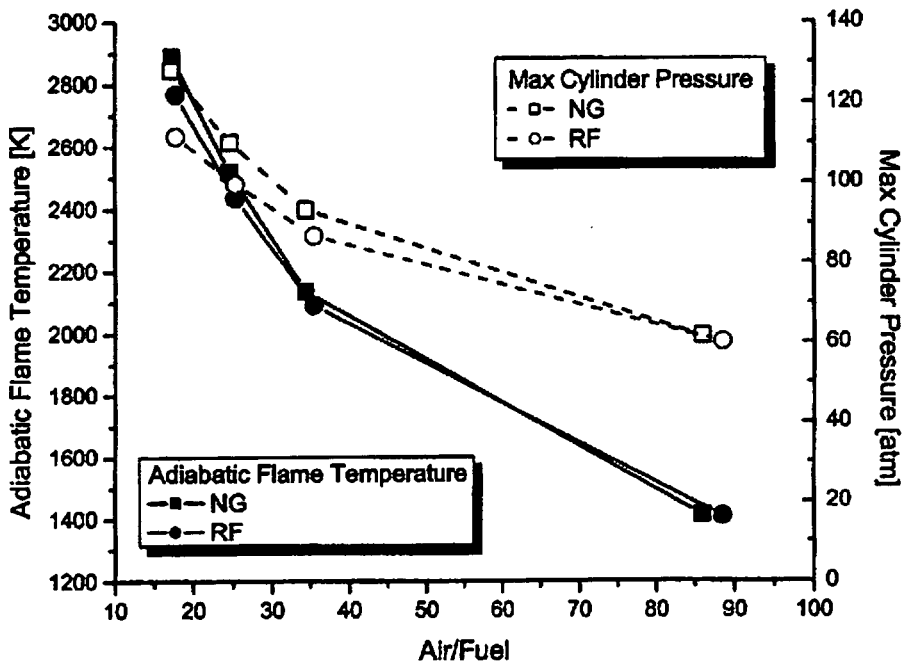
FIG. 14 is a diagram showing adiabatic flame temperature and maximum cylinder pressure as a function of air/fuel ratio.

FIG. 14 shows the adiabatic flame temperature and maximum cylinder pressure of the two fuels for various air/fuel ratios. The reformed fuel showed lower adiabatic temperature and cylinder pressure than the natural gas as the air/fuel ratio decreased (i.e. richer conditions), while obtaining higher power output than the latter. This result was obtained mainly because of the relatively high concentrations of $CO_2$ and water vapor in the reformed fuel. This result indicates that with the use of the reformed fuel, the operating range of the engine can be extended without using any EGR, or water or steam injection, without diminishing engine performance.

Figure 15:
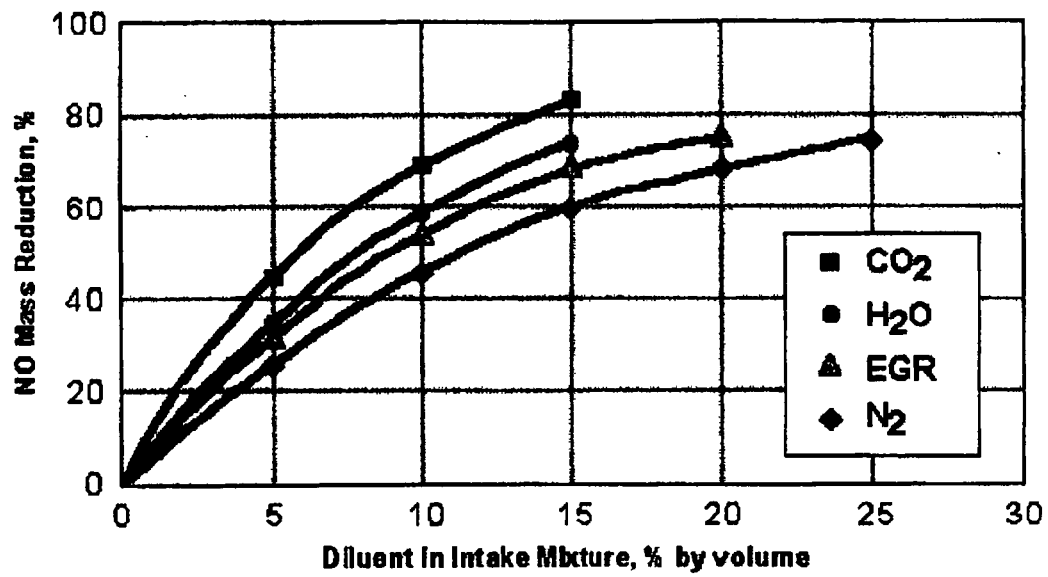
FIG. 15 is a diagram showing the effect of diluents on NO reduction.

FIG. 15 shows the effect of various diluents ($CO_2$, $H_2O$, EGR, and $N_2$) on NO reduction (or combustion temperature reduction). Gases of higher $C_p$ can absorb more heat and are more effective $NO_x$ reduction diluents. At room temperature and pressure, the specific heats ($C_p$) of $CO_2$, $H_2O$, and $N_2$ are 36.94, 33.54, 29.12 kJ/kgmol-K, respectively. Combustion products consist mostly of $CO_2$, $H_2O$, and $N_2$, thus exhaust gas recirculation has a lesser capability of reducing the $NO_x$ emissions than $CO_2$ and $H_2O$. This result shows that the diluents in the reformed fuel may perform better than exhaust gas recirculation in decreasing combustion temperature.

Figure 16:
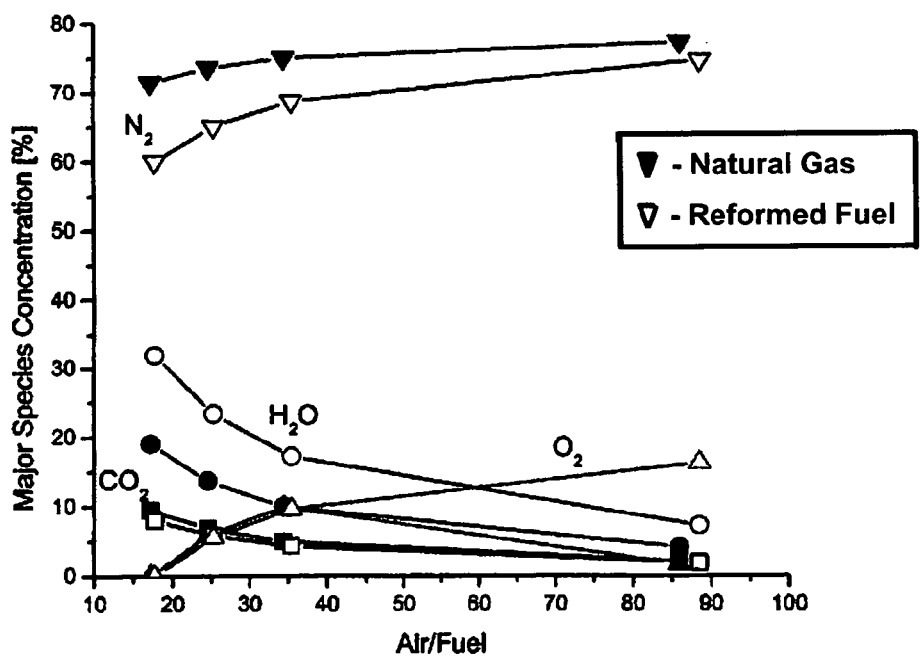
FIG. 16 is a diagram showing the major exhaust gas species concentration as a function of air/fuel ratio.

In FIG. 16, major combustion products ($CO_2$, $H_2O$, $N_2$, and $O_2$) are shown with the air/fuel ratio for the two fuels. Overall, the reformed fuel showed higher $H_2O$ and lower $N_2$ concentrations than the natural gas. The concentrations of $CO_2$ and $O_2$ were equivalent between the two fuels. The $H_2O$ concentration of the natural gas was observed to be significantly lower than that of the reformed fuel. This result clearly shows why the reformed fuel had a higher exhaust loss than the natural gas in FIG. 13.

Figure 17:
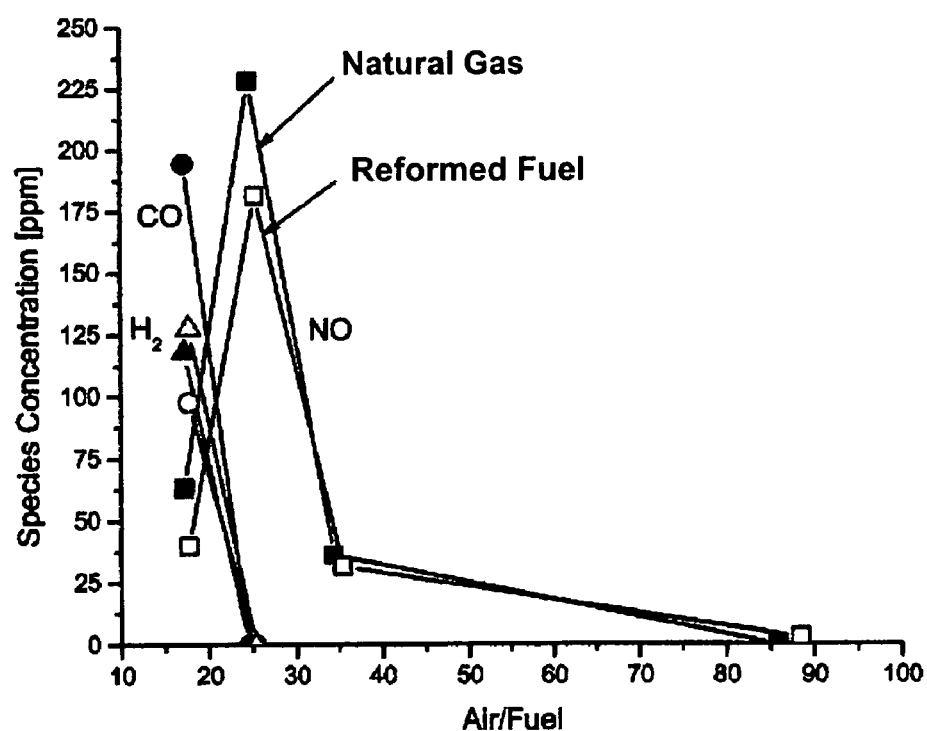
FIG. 17 is a diagram showing exhaust gas species concentration as a function of air/fuel ratio.

FIG. 17 shows selected combustion products not shown in FIG. 16 for various air/fuel ratios for the two fuels. At higher air/fuel ratios (i.e. above A/F=30), there are no noticeable differences in the NO emissions between the two fuels. But, at equivalence ratios below 30, the reformed fuel produced significantly lower NO emissions than the natural gas, while obtaining higher engine power output. This result can be explained by the high concentrations of $CO_2$ and $H_2O$ in the reformed fuel. At high air/fuel ratios, both fuels showed negligible amounts of CO and $H_2$ emissions due to complete combustion. However, at lower air/fuel ratios, the reformed fuel showed lower CO and higher $H_2$ concentrations than the natural gas. This result may be caused by two reasons: (1) better combustion with reformed fuel, leading to lower combustion loss, and (2) shift reaction of CO and $H_2O$ to form $H_2$, leading to higher $H_2$ concentration.

While in the foregoing specification this invention has been described in relation to certain preferred embodiments thereof, and many details have been set forth for the purpose of illustration, it will be apparent to those skilled in the art that the invention is susceptible to additional embodiments and that certain of the details described herein can be varied considerably without departing from the basic principles of this invention.

We claim:
1. A system comprising:
a reciprocating internal combustion engine having an engine fuel inlet and an engine exhaust gas outlet;
a lubricating oil system adapted to circulate lubricating oil through said reciprocating internal combustion engine;
a cooling system adapted to circulate a cooling fluid through said reciprocating internal combustion engine;
a lubricating oil heat exchanger adapted to remove heat from said lubricating oil;
an engine coolant heat recovery system adapted to remove heat from said cooling fluid;
an exhaust gas heat recovery system adapted to recover heat from an exhaust gas generated by said reciprocating internal combustion engine;
a steam generating circuit having a water inlet and a steam outlet, said steam generating circuit in serial heat exchange relation with each of said lubricating oil heat exchanger, said engine coolant heat recovery system and said exhaust heat recovery system;

a thermochemical recuperator having an outer shell having an exhaust gas inlet in fluid communication with said engine exhaust gas outlet, an exhaust gas outlet in fluid communication with said exhaust gas heat recovery system, a recuperator feedstock fuel inlet and a reformed fuel outlet;

a fuel conduit having a feedstock fuel inlet and a feedstock fuel outlet in fluid communication with said recuperator feedstock fuel inlet, said fuel conduit in fluid communication with a steam source; and a reformed fuel conduit in fluid communication with said reformed fuel outlet and said engine fuel inlet.

2. A system in accordance with claim 1 further comprising an exhaust gas recirculation system having a recirculated exhaust gas outlet in fluid communication with said feedstock fuel conduit.

3. A system in accordance with claim 2, wherein said steam source comprises said exhaust gas recirculation system.

4. A system in accordance with claim 1, wherein said reciprocating internal combustion engine is a Miller-cycle engine.

5. A system in accordance with claim 1 further comprising an afterburner having an afterburner exhaust gas inlet in fluid communication with said engine exhaust gas outlet and an afterburner exhaust gas outlet in fluid communication with said exhaust gas inlet of said thermochemical recuperator.

6. In a reciprocating internal combustion engine comprising a fuel inlet, an exhaust gas outlet, a lubricating oil circulation system adapted to circulate lubricating oil through said reciprocating internal combustion engine and a cooling system adapted to circulate a coolant through said reciprocating internal combustion engine, a method for operation of said reciprocating internal combustion engine comprising the steps of:

introducing a reformed fuel through said fuel inlet into said reciprocating internal combustion engine;

burning said reformed fuel in said reciprocating internal combustion engine, generating heated lubricating oil, heated coolant and heated exhaust gases;

transferring a first heat portion from said heated lubricating oil to a feedwater stream, generating warm water;

transferring a second heat portion from said heated coolant to said warm water, generating at least one of hotter water and steam;

transferring a third heat portion from said heated exhaust gases to said at least one of said hotter water and said steam, converting any said hotter water to additional steam;

mixing said steam with a feedstock fuel, forming a mixture of said steam and said feedstock fuel;

introducing said mixture into a thermochemical recuperator; and passing said heated exhaust gases through said thermochemical recuperator, forming said reformed fuel from said feedstock fuel and forming reduced temperature heated exhaust gases.

7. A method in accordance with claim 6, wherein said reduced temperature heated exhaust gas comprises steam and is mixed with said feedstock fuel.

8. A method in accordance with claim 6, wherein said feedstock fuel is natural gas.

9. A method in accordance with claim 6, wherein said reformed fuel comprises hydrogen.

10. A method in accordance with claim 6, wherein said heated exhaust gases are passed through an afterburner prior to passing through said thermochemical recuperator.

* * * * *